VIRTUAL-EARTH AMPLIFIERS
Filed Nov. 1, 1960
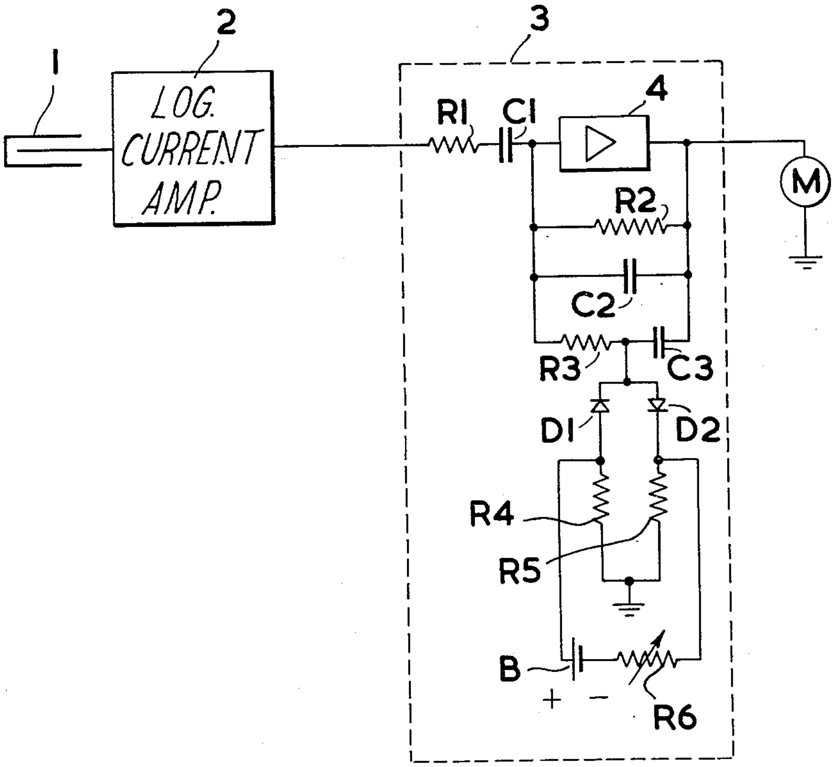
INVENTOR
Donald Harrison
BY
Lawson and Taylor

United States Patent Office 3,121,199

Patented Feb. 11, 1964

3,121,199

VIRTUAL-EARTH AMPLIFIERS

Donald Harrison, Broadstone, Dorset, England, assignor to United Kingdom Atomic Energy Authority, London, England Filed Nov. 1, 1960, Ser. No. 66,634

Claims priority, application Great Britain Nov. 4, 1959

6 Claims. (Cl. 328—128)

This invention relates to virtual-earth amplifiers, particularly for use as differentiating amplfiers in reactor period meters.

Conventional reactor D.C. period meters comprise a current amplifier which produces an output voltage proportional to the logarithm of the input current from the ionisation chamber in the reactor, followed by a virtual-earth differentiating amplifier the output of which is thus proportional to the period of the reactor. The output is usually calibrated in reactor doubling time. The logarithmic characteristic of the current amplifier is frequently obtained by using the logarithmic characteristic of a thermionic diode when operated in the retarding field region.

The noise conditions in such an arrangement require a long smoothing time-constant at the low-current end of the range but permit a shorter time-constant at the high-current end. The long delays associated with long smoothing time-constants are unacceptable at the high-current end of the range. In practice the input capacity of the current amplifier in parallel with the diode provides a smoothing time-constant which decreases with increasing current in approximately the required way.

Unfortunately this variable time-constant produces an overshoot of the reactor period indication which becomes more pronounced as the minimum starting current is reduced and as the measured period decreases. This overshoot is caused by the output of the current amplifier initially lagging on the current input, and thereafter catching up with it as the current increases and the input time-constant thus decreases. The overall design of the period meter is thus a compromise which takes into account noise, delay, overshoot, minimum starting current and minimum usable period. This compromise makes it necessary to accept delays and overshoots, particularly at the low-current end of the range, and places a limit on the minimum measurable current and period. The problem is discussed in paper P/56 of the Poceedings of the 1958 Geneva Conference on the Peaceful Uses of Atomic Energy, published in vol. 11, pp. 498–508. It is one object of the present invention to provide an improved period meter circuit in which these objectionable features are reduced.

According to the present invention there is provided a direct-coupled virtual-earth amplifier having a smoothing time-constant which is large for fixed input currents but is reduced during changes of input current.

Also according to the present invention a direct-coupled virtual-earth amplifier including a first resistor connected between its input and output is provided with smoothing means comprising a first capacitor connected in series with a second resistor across the first resistor, and a pair of oppositely-poled diodes connected in parallel between the junction of the first capacitor and second resistor and the virtual-earth potential. Means are preferably provided for applying forward bias to the pair of diodes; the means may comprise a biasing resistor connected across each diode and means for passing a predetermined current through the biassing resistors.

The invention furter provides a differentiating amplifier comprising an amplifier as aforesaid having a third resistor and a second capacitor connected in series with the input thereof and a third capacitor connected in parallel with the first resistor, the third capacitor being small compared with the first capacitor.

A reactor period meter according to the present invention comprises a differentiating amplifier as aforesaid connected in series with a preceding amplifier adapted to produce an output voltage proportional to the logarithm of an input current, said preceding amplifier having an input time-constant which is short compared with the smoothing time-constant of the differentiating amplifier.

An example of a reactor period meter circuit embodying the invention is shown in the accompanying drawing, which is partially schematic.

In this drawing current from an ionisation chamber 1 is fed to a logarithmic current amplifier 2 of the kind described in British patent specification No. 748,415, which is arranged to have a short input time-constant. This is achieved in the present embodiment by omitting the additional input capacity referred to in the aforementioned patent. In other arrangements the effective input capacity may be reduced by using conventional feedback techniques to give virtual-earth input conditions. The output voltage from amplifier 2 is fed to a differentiating amplifier 3 which comprises a linear D.C. voltage amplifier 4, an input differentiating capacitor C1, and a differentiating resistor R2 connected between input and output of the amplifier 4. The output voltage, which is proportional to reactor period, is indicated on a meter M. Because of the feedback through R2, a virtual-earth condition exists at the input to amplifier 4, the virtual-earth potential being the potential to which meter M is returned, namely earth. For smoothing purposes the differentiating amplifier 3 includes two integrating circuits comprising a resistor R1 connected in series with C1 and a capacitor C2 connected in parallel with R2 respectively.

Connected in series across C2 are a resistor R3 connected to the input of amplifier 4 and a capacitor C3 connected to the output thereof. The junction of R3 and C3 is connected to earth through two diodes D1 and D2 connected in parallel to conduct in opposite directions. The low-value resistors R4 and R5 connected across D1 and D2 are provided for biassing purposes as explained later.

In operation C1 and R2 determine the differentiating behaviour of the amplifier 3, and with R3, C3, D1 and D2 removed the circuit would be a conventional differentiating amplifier with a smoothing time-constant determined by the integrating circuits R1C1 and R2C2.

R3 is made much smaller than R2, and in the quiescent state (fixed period) D1 and D2 present an impedance which is large relative to R3. For large values of C3 the smoothing time-constant now becomes approximately R2(C2+C3), and this value can be made sufficiently large (by making C3 large) to give the required smoothing for the worst noise conditions. Owing to the reduced input time-constant of the logarithmic current amplifier 2, the voltage applied to the differentiating amplifier 3 will now include more noise than in the conventional arrangement.

When a change of period occurs and the output voltage of amplifier 4 changes, either D1 or D2 conducts, depending on the sign of the change, and C3 is effectively removed from the circuit. The smoothing time constant is now short so that the delay in indicating the new period is reduced. Moreover when the period becomes fixed again no overshoot occurs since C3 has been properly charged through D1 or D2. Owing to the reduced time-constant the noise increases while the reactor period is changing, but as the indicated level is changing anyway, the momentary increase in noise is acceptable.

If R3 is not made small relative to R2, the smoothing in the quiescent state is not increased to the same extent, but some improvement is effected. Preferably the diode resistance when conducting is less than 1/10 of R3 and when non-conducting more than 10 times R3.

To ensure that the silicon diodes D1 and D2 operate on a small deviation from the steady state, a forward bias sufficient to bring them near to the verge of conduction is aplied from a battery B which supplies current to the resistors R4 and R5. The value of the current, and hence of the bias voltage developed across these resistors, is controlled by the variable resistor R6.

When either diode is conducting, R3 is effectively connected between the input of the amplifier 4 and earth, with a consequent reduction in gain. However, it can be shown that, provided the amplifier 4 has sufficient gain, the ratio R2/R3 can be quite large without seriously affecting the performance of the circuit.

For general-purpose reactor instrumentation, a 4 second delay in indicating 90% of a change in reactor period reading is acceptable. It can be shown that optimum smoothing is achieved when the time-constants R1C1 and R2C2 are made equal, and that the above-mentioned 4 second delay is achieved by making each of these time-constants 1 second. In the quiescent state a suitable smoothing time-constant is about 10 seconds.

Component values which have been used in the differentiating amplifier 3 to give the above time-constants are as follows. The circuit was designed for an input of 3.3 volts/decade and to give 100 volts output for 20 seconds doubling time.

R1=$5\times10^5\Omega$
R2=$10^9\Omega$
R3=$10^7\Omega$
R4, R5=220Ω
R6=10 KΩ
D1, D2=silicon diodes Ferranti type ZS8
Battery B=3 v.
Amplifier 4 gain=1000
Amplifier 2 input time-constant=0.1 second
C1=2 μF.
C2=0.001 μF.
C3=0.02 μF.

R6 is set to give a forward bias of 0.4 volt across each diode.

I claim:

1. A direct-current virtual-earth amplifier including a first resistor connected between its input and output, having smoothing means comprising a first capacitor connected in series with a second resistor across the first resistor, said first capacitor being connected to the output and said second resistor to the input, and a pair of oppositely-poled diodes connected in parallel between the junction of the first capacitor and second resistor and a point at the virtual-earth.

2. A differentiating amplifier comprising an amplifier as claimed in claim 1 having a third resistor and second capacitor connected in series with the input and a third capacitor connected in parallel with the first resistor, the third capacitor being small compared with the first capacitor.

3. A reactor period meter comprising a differentiating amplifier as claimed in claim 2 connected in series with a preceding amplifier adapted to produce an output voltage proportional to the logarithm of an input current, said preceding amplifier having an input time-constant which is short compared with the smoothing time-constant of the differentiating amplifier.

4. An amplifier as claimed in claim 1 having forward biasing means for the diodes comprising a pair of biasing resistors connected in series across the two diodes and means for passing a predetermined current through the biasing resistors, the connection to the point at the virtual-earth potential being taken from the junction of the two biasing resistors.

5. A differentiating amplifier comprising an amplifier as claimed in claim 4 having a third resistor and second capacitor connected in series with the input and a third capacitor connected in parallel with the first resistor, the third capacitor being small compared with the first capacitor.

6. A reactor period meter comprising a differentiating amplifier as claimed in claim 5 connected in series with a preceding amplifier adapted to produce an output voltage proportional to the logarithm of an input current, said preceding amplifier having an input time-constant which is short compared with the smoothing time-constant of the differentiating amplifier.

References Cited in the file of this patent

UNITED STATES PATENTS

| | | |
|---|---|---|
| 2,777,905 | Kelly | Jan. 15, 1957 |
| 2,937,369 | Newbald et al. | May 17, 1960 |

OTHER REFERENCES

Radio and Television News, "Simplified Design of Feedback Equalizers," by Arthur J. Rose, pages 54–57, September 1954.